O. D. WRIGHT.
ANIMAL TRAP.
APPLICATION FILED DEC. 20, 1906.
912,348.
Patented Feb. 16, 1909.
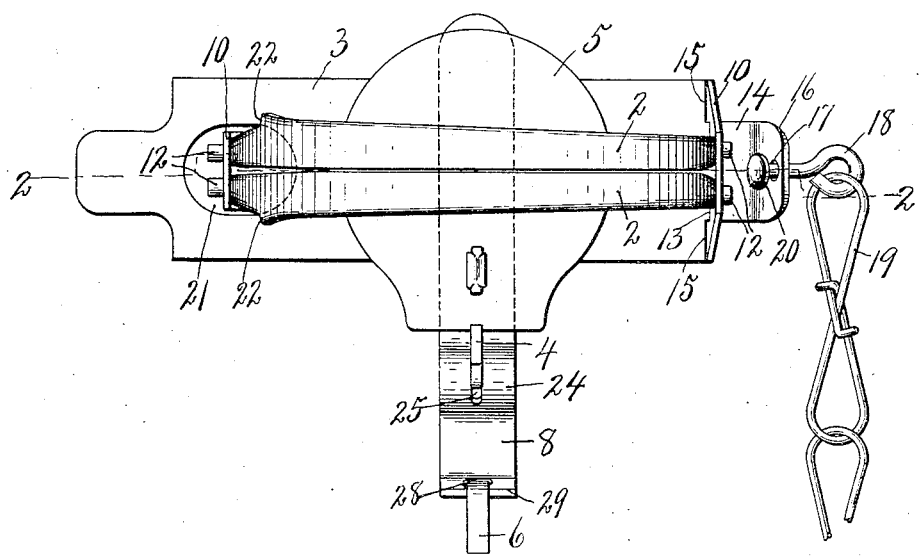
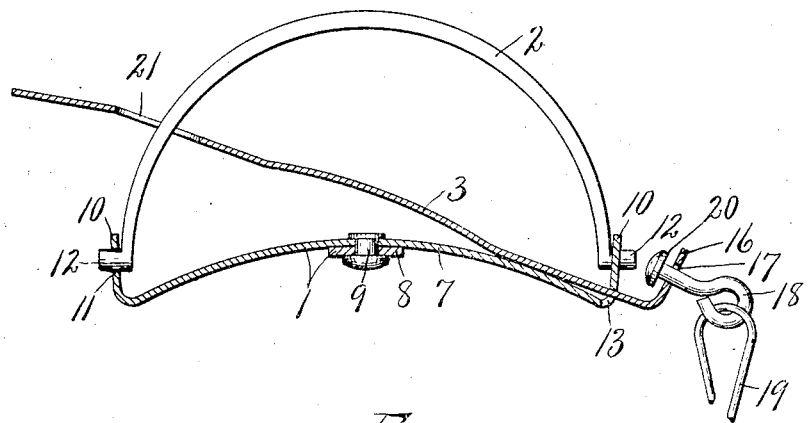
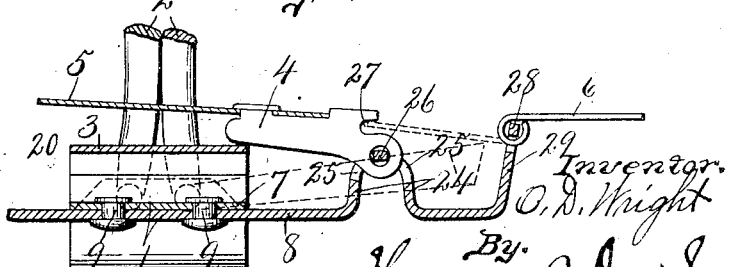

UNITED STATES PATENT OFFICE.

ORRIN D. WRIGHT, OF ONEIDA, NEW YORK, ASSIGNOR TO ONEIDA COMMUNITY, LIMITED, OF ONEIDA, NEW YORK, A CORPORATION OF NEW YORK.

ANIMAL-TRAP.

No. 912,348.  Specification of Letters Patent.  Patented Feb. 16, 1909.

Application filed December 20, 1906. Serial No. 348,784.

*To all whom it may concern:*

Be it known that I, ORRIN D. WRIGHT, of Oneida, in the county of Madison, in the State of New York, have invented new and useful Improvements in Animal-Traps, of which the following, taken in connection with the accompanying drawings, is a full, clear, and exact description.

This invention relates to certain improvements in animal traps in which a pair of gripping jaws are mounted upon a suitable supporting frame and are adapted to be forcibly closed by a spring acting simultaneously on both of the jaws when released by the tripping of the trigger platform. The general aim of all manufacturers of this class of devices is to reduce the number of parts and to otherwise simplify the general structure so as to increase its working efficiency and at the same time reduce the cost of production. Heretofore, so far as I am aware, it has been customary to attach the chains to some part of the frame of the trap through the medium of what might be termed a double swivel connection, that is the eye which received one member of the swivel has heretofore been made in a separate piece and riveted or otherwise secured to the frame of the trap.

One of my objects, therefore, is to provide an integral part of the trap with an eye adapted to receive an eye bolt and form a part of a swivel connection between the chain and trap.

In the special form of trap which I have herein illustrated and described, the spring tongue for actuating the jaws is associated with a spring base having upturned ends formed with apertures in which the pintles of the jaws are journaled, one end of the spring tongue being reduced in width and passed through a transversely elongated opening in one end of the base, the outer extremity of such reduced end of the spring tongue being deflected upwardly and provided with an eye in which is turnable an eye bolt forming with said eye, a swivel, the chain being attached directly to the eye bolt.

The specific object, therefore, is to connect the chain to the trap by a swivel, one part of which constitutes an integral part of the trap for the purpose of reducing the number of parts.

Other objects and uses relating to the specific structure of the trap will be brought out in the following description.

In the drawings,—Figure 1 is a top plan of an animal trap embodying the features of my invention. Fig. 2 is a longitudinal sectional view taken on line 2—2, Fig. 1. Fig. 3 is a transverse sectional view of the same.

This trap consists essentially of a main supporting frame —1—, a pair of gripping jaws —2— both mounted upon the frame, and spring tongue —3— also mounted upon the frame for automatically closing the jaws, a trigger —4— carrying a platform —5—, and a detent —6— for locking one of the jaws in its open position against the action of the jaw-retracting spring —3—.

The main supporting frame consists essentially of a spring bar —7— and a cross bar —8— secured thereto by suitable fastening means, as rivets —9—. The spring bar —7— preferably consists of a comparatively thin strip of flat spring metal arched upwardly from its ends toward the center to afford a spring action, the ends of said bar being turned upwardly forming ears —10— each of which is provided with a pair of apertures —11— for receiving the pintles —12— on the opposite ends of the jaws —2—, said bar —7— being also provided at one end with a transverse elongated opening or slot —13— for the reception of one end of the spring tongue —3—.

The jaws —2— are arched upwardly from the ends toward the center and when closed meet in a plane substantially coincident with the longitudinal center of the bar —7—, the ends of said jaws having a slight spring action toward each other to permit them to be compressed between the ears —10— when inserting the pintles —12— into their respective openings or bearings —11—.

The tongue —3— preferably consists of a comparatively thin flat strip of spring metal having the greater portion of its length substantially the same width as the frame or bar —7—, one end of the spring tongue —3— resting upon the top face of one end of the bar —7— and is provided with an extension —14— of less width than the main body of the tongue forming shoulders —15—, the reduced extension —14— being passed through the slot —13— and is provided with an upturned ear —16— having an eye —17— for receiving one end of an eye bolt —18— which together with the ear —16— and eye —17— forms a swivel connection between the chain as —19— and tongue —3—. When the reduced extension —14— of the tongue —3— is passed through the slot —13—, the shoulders —15— abut against the inner face of the adjacent ear —10— of the frame bar —7— to prevent endwise movement of the spring tongue in one direction while the upturned ear —16— serves to limit the endwise movement of the tongue in the opposite direction thereby retaining the tongue in operative position.

The inner end of the eye bolt —18— is provided with a head —20— to prevent withdrawal of the eye bolt —18— from the eye —17— and at the same time permitting said eye bolt to turn upon its axis in said aperture —17—. This arrangement positions the bolt slightly removed from the trap.

The intermediate portion of the spring tongue —3— extends downwardly substantially tangential to the arc of curvature of the bar —7— so as to afford ample spring action for its free end, which latter is provided with an oval opening —21— for receiving the adjacent ends of jaws —2— and is also of sufficient width to receive the adjacent ear —10— of the bar —7— when the spring is depressed in the act of opening the jaws. The transverse width of the opening —21— is substantially equal to the transverse width of the jaws —2— at the point of engagement with the spring of said jaws when the latter are closed, and in order that the spring may still exert a pressure upon the jaws to hold them in their closed position when the spring is released, I provide the outer edge of each of the jaws with alining sharp angular shoulders —22— which also form limiting stops for the spring and cause a wedging action of the spring with the outer edges of the jaws to hold the meeting edges of said jaws together with greater firmness, thereby avoiding any lost motion which might assist the animal in escaping from the trap.

A portion of the cross bar —8— at one side of the bar —7— is bent in the form of a loop —24— as best seen in Figs. 1 and 3, the arched portion of which is provided with opposite slots —25— leaving a central integral pintle or bar —26— at the apex of the loop upon which is pivoted one end of the trigger —4— carrying the platform —5—, said trigger having its rear end recessed at —27— for receiving one end of the detent —6—, the outer end of said detent being pivoted upon a pintle —28— forming an integral part of an upturned ear —29— of the adjacent end of the cross bar —8—.

Reverting now to the opening —21— in the spring tongue —3—, it may be stated that this opening is just of sufficient size to permit an easy play of the tongue and at the same time to prevent excessive endwise movement of said tongue because it will be observed that the opposite end of the tongue rests loosely upon the upper surface of the bar —7— and while the shoulders —15— serve to prevent endwise movement in one direction, the inner end of the opening —21— engaging the inner faces of the jaws serve to prevent endwise movement of said tongue in the opposite direction and the sides of the opening prevent lateral movement of the tongue so that the latter is held positively in operative position without extra securing means.

In "setting" the jaws the free end of the spring —3— is depressed whereupon the jaws —2— are opened until one of them is brought below a direct line between the pintles —26— and —28— after which the detent —6— is swung upon its pintle —28— and its free end engaged in the recess —27— to lock the jaws against the action of the spring and at the same time hold the platform in its operative position, the operation of the platform and trigger to release the jaws being well understood.

What I claim is:

An animal trap comprising a supporting frame consisting of a spring bar and a cross bar secured together, said spring bar having a vertically extending apertured ear at each end thereof, one of said ears having its lower terminus formed with a transversely extending slot, a pair of arch-shaped gripping jaws each provided with a pair of pintles at their ends, said pintles mounted in the apertures of said ears, each of said jaws furthermore provided with a laterally extending shoulder at the outer edge thereof, said shoulder on each jaw nearer one end thereof than the other end, a spring tongue having one end projecting through said slot and its other end provided with an enlarged opening through which extend said jaws, said spring tongue having its central portion slightly arched, said tongue constituting means when the jaws are released to move the jaws toward each other, said cross bar provided near one end with an arch-shaped portion formed with oppositely disposed slots thereby providing a pintle, said cross bar furthermore having at one end an upwardly extending apertured ear, a platform arranged over said spring tongue, a trigger carrying said platform and pivotally mounted on said pintle, said trigger provided with a recess and bearing upon said spring tongue, a detent pivotally connected to the apertured ear of said cross bar and adapted to engage in said recess for locking one of the jaws and said spring tongue in an inoperative position, said detent adapted to be released when pressure is applied to said platform whereby said spring tongue will close the jaws, said spring tongue formed with an upwardly apertured ear, a headed eye bolt extending through the aperture of the ear of the tongue whereby said bolt is swivelly connected to said ear, and a flexible member attached to the eye of said bolt.

In witness whereof I have hereunto set my hand this 10th day of December 1906.

ORRIN D. WRIGHT.

Witnesses:
E. K. HERRICK,
S. S. ELDRIDGE.